(12) United States Patent
Clifford et al.

(10) Patent No.: US 11,809,424 B2
(45) Date of Patent: Nov. 7, 2023

(54) AUTO-SCALING A QUERY ENGINE FOR ENTERPRISE-LEVEL BIG DATA WORKLOADS

(71) Applicant: International Business Machines Corporation, Armonk, NY (US)

(72) Inventors: Austin Clifford, Glenageary (IE); Ilker Ender, Dublin (IE); Mara Matias, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 17/078,327

(22) Filed: Oct. 23, 2020

(65) Prior Publication Data
US 2022/0129460 A1 Apr. 28, 2022

(51) Int. Cl.
*G06F 16/2453* (2019.01)
*G06F 16/28* (2019.01)
(Continued)

(52) U.S. Cl.
CPC ........ *G06F 16/24532* (2019.01); *G06F 9/505* (2013.01); *G06F 16/2308* (2019.01);
(Continued)

(58) Field of Classification Search
CPC ............. G06F 2209/505; G06F 9/5072; G06F 16/24532; G06F 16/285; G06F 16/2308; G06F 9/505
See application file for complete search history.

(56) References Cited

U.S. PATENT DOCUMENTS

| 8,352,945 B2 * | 1/2013 | Haas ................. G06F 16/24532 |
| | | 718/101 |
| 8,510,273 B2 * | 8/2013 | Richards ............... G06F 16/217 |
| | | 707/688 |

(Continued)

FOREIGN PATENT DOCUMENTS

| AU | 2018253642 A1 | 11/2018 |
| CN | 101344882 A | 1/2009 |

(Continued)

OTHER PUBLICATIONS

"Horizontal Pod Autoscaler",Last modified Sep. 30, 2020, Kubernetes, 17 pps., <https://ibm.biz/BdZzGG>.

(Continued)

*Primary Examiner* — Mark E Hershley
(74) *Attorney, Agent, or Firm* — Gavin Giraud

(57) ABSTRACT

Aspects of the present invention disclose a method, computer program product, and system for auto-scaling a query engine. The method includes one or more processors monitoring query traffic at the query engine. The method further includes one or more processors classifying queries by a plurality of service classes based on a level of complexity of a query. The method further includes one or more processors comparing query traffic for each service class with a concurrency threshold of a maximum number of queries of the service class allowed to be concurrently processed. The method further includes one or more processors instructing auto-scaling of a cluster of worker nodes to change a number of worker nodes available in the cluster based on the comparison, over a defined period of time, of the query traffic relative to a defined upscaling threshold and a defined downscaling threshold.

25 Claims, 11 Drawing Sheets

(51) Int. Cl.
*G06F 9/50* (2006.01)
*G06F 16/23* (2019.01)

(52) U.S. Cl.
CPC ...... *G06F 16/285* (2019.01); *G06F 2209/508* (2013.01); *G06F 2209/5022* (2013.01)

(56) References Cited

U.S. PATENT DOCUMENTS

| | | | | |
|---|---|---|---|---|
| 8,527,473 | B1* | 9/2013 | Brown | G06F 16/25 |
| | | | | 707/685 |
| 8,650,340 | B2* | 2/2014 | Yan | G06F 16/24532 |
| | | | | 710/39 |
| 8,752,028 | B2* | 6/2014 | Bird | H04L 43/14 |
| | | | | 717/130 |
| 8,775,413 | B2* | 7/2014 | Brown | G06F 16/24549 |
| | | | | 707/718 |
| 9,992,269 | B1* | 6/2018 | Odom | G06F 16/24568 |
| 10,216,770 | B1* | 2/2019 | Kulesza | G06F 16/21 |
| 10,409,642 | B1* | 9/2019 | Tang | G06F 9/5005 |
| 10,885,565 | B1* | 1/2021 | Russell | G06Q 30/0625 |
| 10,924,398 | B2* | 2/2021 | Vutharkar | G06F 16/245 |
| 11,010,150 | B2* | 5/2021 | Kubecka | G06F 8/65 |
| 11,061,896 | B2* | 7/2021 | White | G06F 16/9024 |
| 11,556,541 | B2* | 1/2023 | Zhou | G06F 16/248 |
| 2007/0087756 | A1* | 4/2007 | Hoffberg | G06Q 10/06375 |
| | | | | 455/450 |
| 2007/0271570 | A1* | 11/2007 | Brown | G06F 9/5033 |
| | | | | 707/E17.007 |
| 2009/0037430 | A1* | 2/2009 | Mukkamala | G06F 16/252 |
| | | | | 709/248 |
| 2009/0254971 | A1* | 10/2009 | Herz | G06Q 30/0603 |
| | | | | 726/1 |
| 2009/0327216 | A1* | 12/2009 | Brown | G06F 16/24549 |
| 2010/0070448 | A1* | 3/2010 | Omoigui | H01L 27/1463 |
| | | | | 706/55 |
| 2011/0010359 | A1* | 1/2011 | Burger | G06F 16/24542 |
| | | | | 707/718 |
| 2011/0055168 | A1* | 3/2011 | Richards | G06F 16/217 |
| | | | | 707/688 |
| 2012/0191716 | A1* | 7/2012 | Omoigui | H01L 27/14647 |
| | | | | 707/E17.069 |
| 2014/0282591 | A1* | 9/2014 | Stich | G06F 9/505 |
| | | | | 718/104 |
| 2014/0337837 | A1* | 11/2014 | Padala | G06F 9/5005 |
| | | | | 718/1 |
| 2015/0149501 | A1* | 5/2015 | Prakash | G06F 9/5027 |
| | | | | 707/769 |
| 2015/0254330 | A1* | 9/2015 | Chan | G06F 16/273 |
| | | | | 707/613 |
| 2015/0269224 | A1 | 9/2015 | Kundu | |
| 2015/0286725 | A1 | 10/2015 | Quist | |
| 2016/0323377 | A1* | 11/2016 | Einkauf | G06F 9/5077 |
| 2016/0379125 | A1* | 12/2016 | Bordawekar | G06F 9/5027 |
| | | | | 706/12 |
| 2017/0091204 | A1* | 3/2017 | Minwalla | H04L 41/12 |
| 2017/0147961 | A1* | 5/2017 | Haas | G06Q 10/063118 |
| 2017/0199770 | A1* | 7/2017 | Peteva | G06F 9/505 |
| 2018/0089271 | A1 | 3/2018 | Kosuru | |
| 2018/0203744 | A1 | 7/2018 | Wiesmaier | |
| 2019/0325370 | A1 | 10/2019 | Das | |
| 2019/0364109 | A1 | 11/2019 | Oks | |
| 2020/0050501 | A1* | 2/2020 | Cooke | G06F 9/542 |
| 2020/0050612 | A1* | 2/2020 | Bhattacharjee | G06F 16/24526 |
| 2020/0065303 | A1* | 2/2020 | Bhattacharjee | G06F 16/278 |
| 2020/0169602 | A1* | 5/2020 | Aronovich | H04L 67/10 |
| 2020/0264928 | A1* | 8/2020 | Kalmuk | G06F 9/5011 |
| 2021/0011916 | A1* | 1/2021 | Zhou | G06F 16/24553 |
| 2022/0043822 | A1* | 2/2022 | Möhler | G06F 16/248 |
| 2022/0129460 | A1* | 4/2022 | Clifford | G06F 9/5022 |

FOREIGN PATENT DOCUMENTS

| | | |
|---|---|---|
| CN | 105786992 A | 7/2016 |
| CN | 108920552 A | 11/2018 |
| CN | 109766175 A | 5/2019 |
| WO | 2014016950 A1 | 1/2014 |

OTHER PUBLICATIONS

"Workload Management", IBM Knowledge Center, Printed from the Internet on Oct. 14, 2020, 4 pps., <https://ibm.biz/BdzWwW>.

Mell et al., "The NIST Definition of Cloud Computing", National Institute of Standards and Technology, U.S. Department of Commerce, NIST Special Publication 800-145, Sep. 2011, 7 pages.

"Patent Cooperation Treaty PCT Notification of Transmittal of the International Search Report and the Written Opinion of the International Searching Authority, or the Declaration", International application No. PCT/IB2021/059207, International filing date Oct. 7, 2021 (Oct. 7, 2021), dated Jan. 13, 2022 (Jan. 13, 2022), 10 pages.

* cited by examiner

AUTO-SCALING A QUERY ENGINE FOR ENTERPRISE-LEVEL BIG DATA WORKLOADS

BACKGROUND OF THE INVENTION

The present invention relates generally to the field of query engines, and more particularly to auto-scaling query engines.

Modern cloud technologies offer great opportunity for data analytics. The trend towards the separation of compute and storage means that compute engines can be scaled relative to the workload needs. For example, cloud object stores offered by all the leading cloud providers, have the flexibility to store both structured and unstructured data at vast scales with true elastic scaling and a very high degree of durability and reliability. Separating compute from storage, with the compute running in containerization technologies, such as Kubernetes® (Kubernetes is a trademark of Linux Foundation), means that clusters can be quickly horizontally scaled up or down according to workload demands.

Query engine technologies, such as structured query language (SQL) engines on Hadoop® (Hadoop is a trademark of Apache Software Foundation) or Object Store technologies, have the ability to directly reference data in the external storage and provide the capability to analyze data where it sits using existing complex SQL and business intelligence tooling. Additionally, the technologies offer the ability to scale up or down the number of SQL engine compute nodes to meet the varying demands of the business across competing workloads.

Modern massively parallel processing (MPP) SQL engines typically comprise a cluster of a head node and a plurality of "n" worker nodes (where n can be in the hundreds or even thousands of nodes). One significant challenge that has surfaced in this elastic paradigm is the ability to scale a big data SQL engine cluster in an orderly fashion such that the cluster is responsive but not overly sensitive to changing workload patterns. Scaling a SQL engine to respond to varying complex workloads based on simple host-based metrics such as central processing unit (CPU) or memory usage can be problematic. CPU usage, for example, can be unpredictable and vary quite rapidly even for the execution of a single complex SQL query, depending on which stage of the query is currently in progress. Scaling the cluster in such a simplistic way can lead to thrashing, where the number of workers nodes fluctuate irregularly due the CPU metrics unpredictability. The result of thrashing can have an adverse effect on overall cluster stability and in an extreme case render the automatic scaling unusable.

Another challenge is the ability to drain worker nodes of active queries in a prompt fashion but without interrupting any in-flight queries when downscaling the cluster. For example, one or two long running queries can be in-progress on a worker node at any given time. Once a query fragment has commenced on a given worker, the query fragment is bound to that worker and cannot be moved to another worker. SQL query access plans are complex in nature, involving numerous stages involving operations such as hash-joins, nested loop joins, sort operations, and so on. When a complex query is distributed to the available worker nodes, each worker's involvement in the query execution is not gated purely by disk Input/Output (IO). In other words, diverting blocks of data being read from the storage to another worker does not eliminate a worker's involvement in the rest of the query, as the worker may be participating in a cluster-wide shuffle or hash join streamed operation.

SUMMARY

Aspects of the present invention disclose a method, computer program product, and system for auto-scaling a query engine. The method includes one or more processors monitoring query traffic at the query engine. The method further includes one or more processors classifying queries of the query traffic by a plurality of service classes based on a level of complexity of a query. The method further includes one or more processors comparing query traffic for each service class with a concurrency threshold of a maximum number of queries of the service class allowed to be concurrently processed. The method further includes one or more processors instructing an auto-scaling of a cluster of worker nodes to change a number of worker nodes of the worker nodes available in the cluster based on the comparison, over a defined period of time, of the query traffic relative to a defined upscaling threshold and a defined downscaling threshold. The auto-scaling adds or removes a number of worker nodes to a cluster of worker nodes that processes queries of the query engine.

Accordingly, embodiments of the present invention can provide the advantage that the cluster of worker nodes can be scaled up or down in response to workload needs of varying complexity.

In another embodiment, the defined upscaling threshold and the defined downscaling threshold may each be a defined threshold ratio of a number of queries in the query traffic compared to the concurrency threshold. This may determine the workflow of a service class in comparison to the capacity for that class.

In another embodiment, the method may include one or more processors evaluating a number of worker nodes to be added or removed based on an aggregation of the comparisons of query traffic across all service classes at a given time. Evaluating a number of worker nodes to be added or removed may include, for each service class for which the defined upscaling threshold or the defined downscaling threshold is breached, basing the number of worker nodes to be added or removed on a current proportion of worker nodes assigned to the service class and a required increase or decrease in capacity based on the comparison.

In another embodiment, the method may include one or more processors adjusting the concurrency threshold for one or more service classes based on a new number of worker nodes in the cluster after auto-scaling. This updates the threshold automatically after a scaling has taken place. For upscaling, the query traffic may be determined by queued queries waiting in queues for each service class due to the concurrency threshold being reached for the service class; and the defined up scaling threshold may be breached when a ratio of a number of queries waiting in a queue for a service class compared to the concurrency threshold for the service class is greater than a defined ratio for a defined period of time. For downscaling, the query traffic may be determined by currently active queries for each service class; and the defined downscaling threshold may be breached when a ratio of a number of active queries for a service class compared to the concurrency threshold for the service class is less than a defined ratio for a defined period of time.

In additional embodiments, the method may include one or more processors providing multiple node groups each comprising a subset of the available worker nodes in the cluster. The node groups are configured for expected durations of queries. The method can further include one or more processors mapping a service class of queries to a node group in order to assign queries of a service class to worker nodes of the mapped node group. Auto-scaling by removing a number of worker nodes may include selecting a number of worker nodes for draining before removal according to node groups with worker nodes being selected from a node group configured for a lowest possible expected duration of queries.

Another aspect of the present invention discloses a method, computer program product, and system for auto-scaling a query engine. The method includes one or more processors classifying queries of query traffic by based on a service class based on respective levels of query complexity. The method further includes one or more processors auto-scaling worker nodes by adding or removing a number of worker nodes to worker nodes available in a cluster based on query traffic at a query engine. The method further includes one or more processors providing multiple node groups, each comprising a subset of the available worker nodes in the cluster, wherein the node groups are configured for an expected duration of queries. The method further includes one or more processors mapping each service class of queries to a node group according to an affinity between service classes and node groups. Further, auto-scaling by removing a number of worker nodes further comprises one or more processors selecting a number of worker nodes for draining before removal according to node groups with worker nodes being selected from a node group configured for a lowest possible expected duration of queries.

Accordingly, embodiments of the present invention can provide the advantage to minimize the impact of downscaling a cluster on in-flight queries by removing nodes that are not busy with long running queries.

In another embodiment, the method may include one or more processors ordering the node groups with node groups for lower expected durations of queries being drained first. In addition, the node groups are dynamic and adjusted according to auto-scaling of the worker nodes.

In additional embodiments, the method may include one or more processors comparing query traffic in the form of active queries for each service class with a concurrency threshold of a maximum number of queries of the service class to be concurrently processed. The method further includes one or more processors auto-scaling by removing a number of worker nodes from the worker nodes available in the cluster based on the comparison breaching a defined downscaling threshold with the breaching maintained for a defined period of time.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings.

Figure 1:
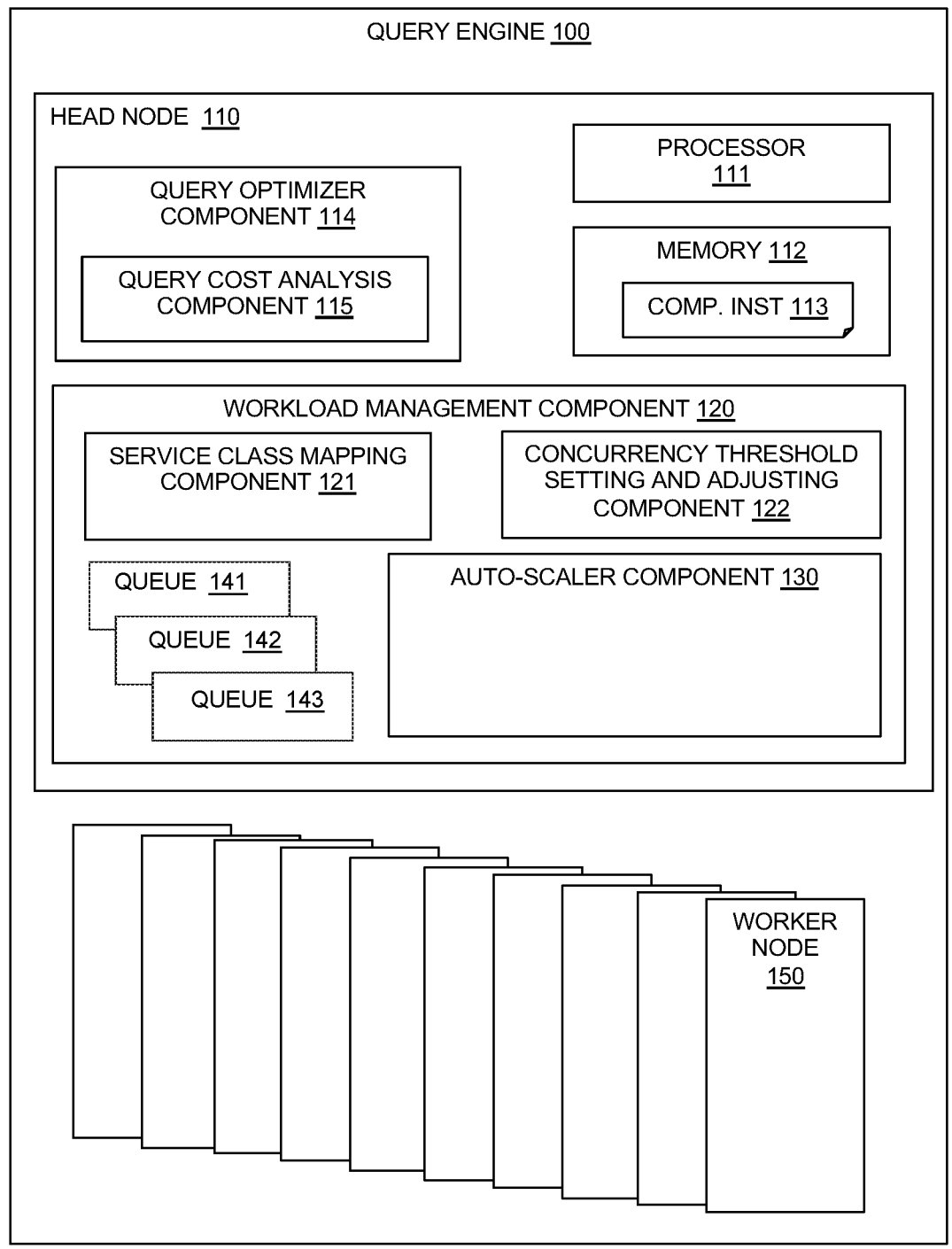
FIG. 1 is a schematic diagram of an example embodiment of a system in which the present invention may be implemented, in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described systems and methods are provided for auto-scaling a query engine for enterprise-level big data workloads. The auto-scaling includes upscaling by adding a number of worker nodes to a cluster of worker nodes that processes queries of the query engine or downscaling by removing a number of the worker nodes.

Embodiments of the present invention can operate to monitor query traffic at the query engine in the form of queued queries and active queries, with the queries classified into service classes based on a level of complexity of the queries. Query traffic for each service class is compared to a concurrency threshold of a maximum number of queries of the service class allowed to be concurrently processed, which determines if thresholds are breached which require upscaling or downscaling of the number of worker nodes to accommodate the query traffic.

Embodiments of the present invention can then instruct an auto-scaling of the cluster to add or remove a number of worker nodes to or from the worker nodes available in the cluster based on the comparison breaching a defined upscaling threshold or a defined downscaling threshold with the breaching maintained for a defined period of time. Scaling of a number of worker nodes in the query engine is performed based on a distribution of queries to worker nodes according to the queries' service classes and instantiating or removing nodes from the query engine is based on the demands for each query service class.

Furthermore, during downscale operations, embodiments of the present invention recognize a need to select worker nodes for removal from the group of worker nodes with the lowest cost complexity banding first, in order to ensure prompt completion of the downscale operation without any impact on in-flight or running queries.

Another aspect of the described methods and systems provides multiple node groups each comprising a subset of the available worker nodes in the cluster with the node groups configured according to expected durations of queries. Each service class of queries is mapped to a node group in order to provide affinity between service classes and node groups. When auto-scaling by downscaling is required, embodiments of the present invention can drain worker nodes prior to removing the worker nodes. Worker nodes are therefore selected for draining before removal according to node groups with worker nodes being selected from a node group configured for a lowest possible expected duration of queries.

In addition to the basic mechanics of expanding or contracting compute capacity in a query engine, embodiments of the present invention recognize a need to accommodate the complexity of queries as determined by the query engine's cost-based optimizer. By determining the query complexity, and then assigning queries to a set of service classes of varying complexity banding, the cluster can expand in a timely and orderly fashion. For contraction operations, embodiments of the present invention recognize a need to select workers for removal from the group of workers with the lowest cost complexity banding first to ensure prompt and orderly removal of candidate workers. In various aspects, automatic upscale and downscale operations can be triggered as determined by the queue lengths and response times.

Embodiments of the present invention can carry out scaling in response to the prevailing end-user workload needs of varying complexity. Further embodiments of the present invention can accomplish elastic and automatic scaling in response to end-user queries based on a cost segmented profile of workload by mapping queries to groups of worker nodes based on cost-profile and then selecting workers for removal from the worker node group associated with the lowest cost queries (and therefore runtime) first.

With these new capabilities, the query engine can operate to automatically scale in a prompt and orderly fashion in-response to a reliable forecast of holistic workload needs obtained from the sophisticated and accurate cost-based optimizer and workload management components.

Referring to FIG. 1, block diagram 101 shows an example embodiment of a query engine 100 for enterprise-level big data workloads, in accordance with embodiments of the present invention.

Modern massively parallel processing (MPP) query engines (e.g., query engine 100), such as SQL engines, typically comprise a cluster of a head node 110, and a plurality of "n" worker nodes 150 (where n can be in the hundreds or even thousands of nodes). Worker nodes 150 essentially map to containers scheduled on a host machine (virtual machine or bare metal) where typically one or up to a handful of worker nodes are placed on each host machine. When a query is submitted to the engine 100, the query is scheduled to run on the available worker nodes 150, where each worker node 150 runs a fragment also known as a runtime section of the compiled query. In some implementations, the list of nodes is referred to as a "dynamic node group". The list is not static, as the list will vary depending on the number of worker nodes 150 present in the cluster at the time the query was submitted and if any have been explicitly excluded (e.g., when a hardware failure is detected on a host machine).

The head node 110 may run on a physical or virtual machine and may include at least one processor 111, a hardware module, or a circuit for executing the functions of the described components, which may be software units executing on the at least one processor. Multiple processors running parallel processing threads may be provided enabling parallel processing of some or all of the functions of the components. Memory 112 may be configured to provide computer instructions 113 to the at least one processor 111 to carry out the functionality of the components.

The query engine 100 may include a query optimizer component 114 that is responsible for choosing the optimal query access plan and may include a query cost analysis component 115 for providing an associated runtime cost estimate of a query. In example embodiments, the cost is a notional unit of measure (referred to as a timeron), but in practice the cost represents a combination of the runtime duration and overall cluster resources needed to complete the query.

In conjunction with the query optimizer component 114, the query engine 100 may also feature a workload management (WLM) component 120 to monitor and control statements executing on the cluster to make efficient use of cluster resources, ensuring that the cluster is not over or under-utilized. At a high level, a certain number of concurrent queries can be executed so as not to over saturate the cluster resources. When the threshold is exceeded, incoming work is queued (e.g., depicted as queue 141, queue 142, and queue 143) until some of the earlier queries have completed.

The WLM component 120 may include a service class mapping component 121 that maps queries based on a respective cost and other attributes (e.g., users and groups, to a logical concept called a WLM service class). The WLM component 120 can segment queries into service classes representing different complexity banding based on the runtime cost calculated by the optimizer component 114. The banding may be calibrated based on a period of monitoring the cluster to understand the relative resource usage of queries across different cost profiles.

For example, queries with a timeron cost less than 150000 might be considered "Trivial," queries of a timeron cost between 150001 and one million as "Simple," queries with a timeron cost between one million and six million as "Medium," and queries with a timeron cost greater than six million as "Complex." Accordingly, queries are mapped to the Trivial, Simple, Medium, and Complex service classes based on the cost estimated by the optimizer component 114 when the query is submitted to query engine 100.

Based on the information gleaned from the calibration phase, a query engine administrator may set thresholds at a concurrency threshold setting and adjusting component 122 of the WLM component 120 for the number of concurrent queries that can run in each of these service classes. In example embodiments, the thresholds set for each band are typically selected such that the overall resource usage for service classes (e.g., for Simple, Medium, and Complex queries) are equal. For example, on a given cluster the process might translate to a concurrency threshold of two queries in the Complex band, five queries in the Medium band, and ten queries in the Simple band. The Trivial queries may be deemed to have so little resource requirements that the queries are left unmanaged. Once a concurrency threshold is reached for a service class, the subsequent queries are managed in a first-in, first-out (FIFO) queue (i.e., queue 141-143) for the associated service class. Accordingly, the administrator can ensure adequate resources available to each service class, which can operate to safeguard the overall stability of the cluster by avoiding a situation where resources are over committed, leading to adverse impacts to stability such as swapping.

The described method and system extend the functionality of query engine 100 to provide an auto-scaler component 130 that drives upscale or downscale operations for the number of worker nodes 150 in response to the query traffic for the service classes. The query traffic is the queue length when considering upscaling and the number of current active queries when considering downscaling. The query traffic is compared to a maximum number of queues processed concurrently per service class. Embodiments of the present invention can monitor the queue lengths (of queue 141-143) and set thresholds for automatic upscaling based on a comparison of a queue length for a service class over a specified time period and the concurrency threshold for that service class. Further embodiments of the present invention can monitor the active number of queries and set thresholds for automatic downscaling based on a comparison of number of active queries for a service class over a specified time period and the concurrency threshold for that service class.

The described method and system also introduce the ability to have multiple dynamic node groups, each comprising a subset of the available worker nodes 150 in the cluster specified as a percentage of the total available worker nodes 150, with workload service classes mapped to the dynamic node groups in order to provide some affinity between the service class and the node groups.

Figure 2:
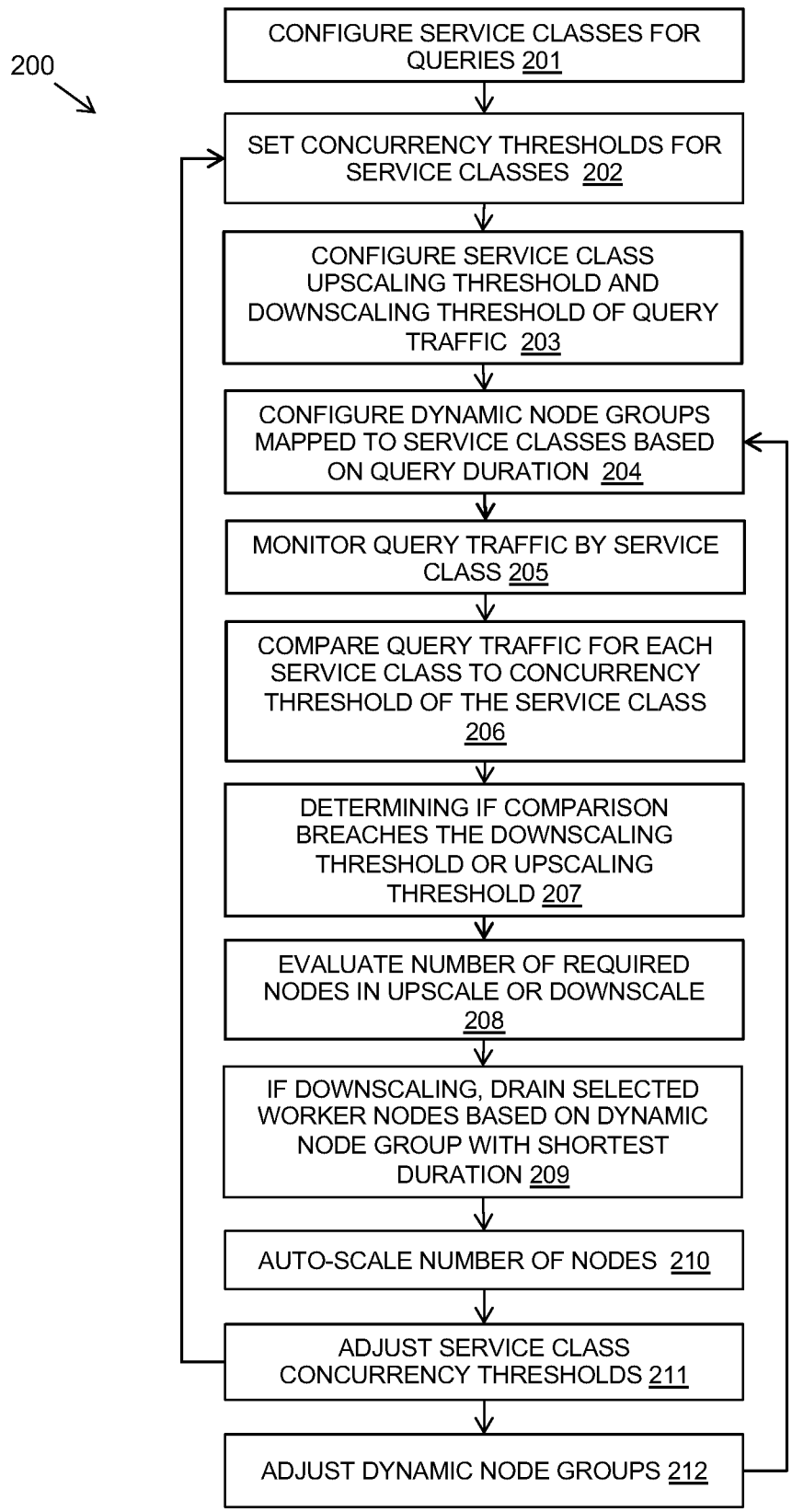
FIG. 2 is a flow diagram of an example embodiment of a method, in accordance with embodiments of the present invention.

Referring to FIG. 2, a flow diagram shows method 200, an example embodiment of an aspect of the described method as carried out by a query engine 100, in accordance with embodiments of the present invention. In various embodiments, query engine 100 (depicted in block diagram 101 in FIG. 1) can perform the processes of method 200. In addition, the method of method 200 may involve initial pre-processing configuration of some parameters used in the method.

In step 201, method 200 configures service classes for queries based on the complexity of the queries. In an embodiment, query engine 100 can utilize a cost-based optimizer component to calculate runtime costs of queries based on a combination of runtime duration and cluster resources required for the queries. The query engine 100 may segment or classify queries into service classes representing different complexity banding based on the runtime costs with the bandings being calibrated based on a period of monitoring the cluster. In step 202, method 200 sets concurrency thresholds for each service class as a maximum number of queries of the service class allowed to be processed concurrently by the cluster.

In step 203, method 200 configures service class upscaling thresholds and downscaling thresholds. In various embodiments, method 200 can configure the defined upscaling threshold and the defined downscaling threshold to each respectively be a defined threshold ratio of a number of queries in query traffic compared to the concurrency threshold. The query traffic may differ when determining if upscaling or downscaling is required. In the described embodiment, query traffic is measured for upscaling purposes by currently queued queries of the service class and query traffic is measured for downscaling purposes by currently active queries.

In step 204, method 200 can configure dynamic node groups, each comprising a subset of the available worker nodes in the cluster and configured for expected durations of queries. For example, method 200 can configure dynamic node groups for short queries, average duration queries, and long duration queries. Service classes of queries are mapped to the node groups in order to assign queries of a service class to worker nodes of the mapped node group.

Once the parameters have been initially configured, method 200 is carried out during operation of the query engine 100 to monitor query traffic for each service class (in step 205). In order to automatically downscale a number of worker nodes active in the query engine 100, in step 205 the method 200 may monitor query traffic in the form of the active queries per service class. In order to automatically upscale a number of worker nodes active in the query engine 100, the method 200 may monitor query traffic in the form of queued queries by service class.

In step 206, method 200 compares the query traffic for each service class to the concurrency threshold for that service class. Then, in step 207, the method 200 determines whether the comparison breaches the defined downscaling threshold or the defined upscaling threshold. The defined upscaling threshold is breached when a ratio of a number of queries waiting in a queue for a service class compared to the concurrency threshold for the service class is greater than a defined ratio for a defined period of time. The defined downscaling threshold is breached when a ratio of a number of active queries for a service class compared to the concurrency threshold for the service class is less than a defined ratio for a defined period of time.

In step 208, method 200 can evaluate a number of nodes required to be added or removed across all the service classes. In example embodiments, method 200 can perform step 208 by aggregating the service classes for which the defined upscaling threshold or the defined downscaling threshold is breached by basing the number of worker nodes to be added or removed for each service class on a current proportion of worker nodes assigned to the service class and a required increase or decrease in capacity based on the comparison.

If downscaling is required, then the method 200 can select worker nodes for draining in order of defined dynamic node groups (step 209). For example, method 200 can select the nodes that are handling less costly queries, such that nodes that may be more efficiently drained. In example embodiments, method 200 can perform the draining process without impacting or interrupting existing queries running on these worker nodes. Method 200 can select candidate nodes for removal during scale-down first from node groups which the shorter running queries are assigned to, then next from the node groups where the medium duration and complexity queries are assigned, and finally only selecting from node group for long running queries as a last resort. Accordingly, the candidate nodes will drain quickly of active queries, which ensures the worker nodes can be released to complete the downscale operation quickly and transparently to the end-users.

When draining of the required number of worker nodes is complete, if required for downscaling, the method 200 can auto-scale the to add or remove the required number of worker nodes (step 210). In both upscaling and downscaling scenarios, the method 200 can adjust the service class concurrency thresholds based on the upscaled or downscaled number of worker nodes (in step 211). Then, the method 200 can feed the adjustment back to the concurrency threshold setting (in step 202) for further monitoring and auto-scaling of the query engine 100. In both upscaling and downscaling scenarios, the method 200 can adjust the dynamic node groups based on the upscaled or downscaled number of worker nodes (in step 212). Then, the method 200 can feed back the adjustment to the dynamic node group configuration (in step 204) for further monitoring and auto-scaling of the query engine 100.

Figure 3:
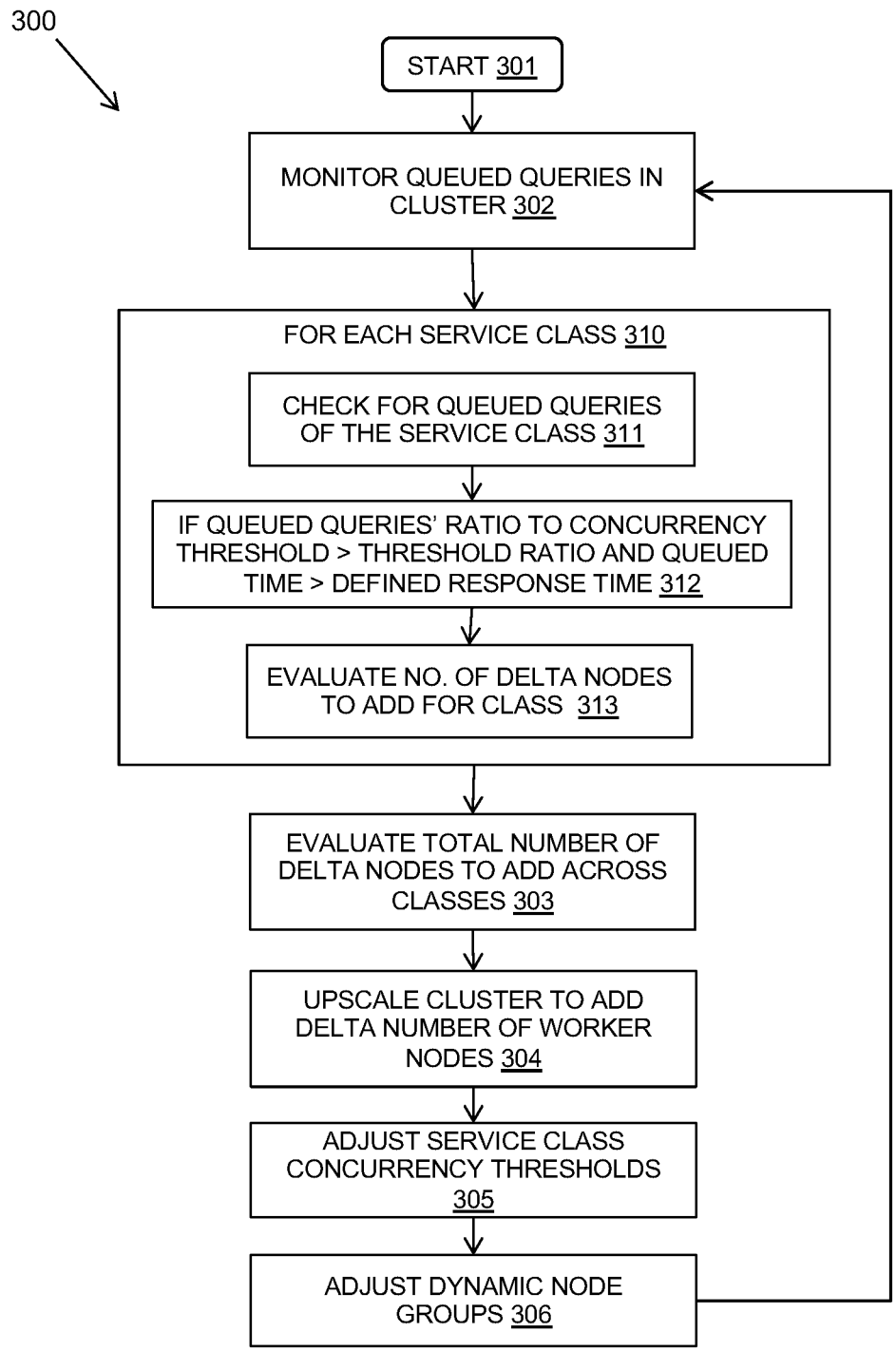
FIG. 3 is a flow diagram of an example embodiment of an upscaling method, in accordance with embodiments of the present invention.

Referring to FIG. 3, a flow diagram shows method 300, an example embodiment of a method of automatically upscaling a cluster of nodes in a query engine 100, in accordance with embodiments of the present invention. In various embodiments, query engine 100 (depicted in block diagram 101 in FIG. 1) can perform the processes of method 300.

In step 301, the method 300 initiates, then in step 302, the method 300 monitors queued queries in the cluster of the query engine 100. Then, in process 310 of method 300, for each service class, the method 300 performs the process of steps 311-312 in an ongoing parallel manner. In step 311, the method checks for queued queries for the service class. In response to determining (in step 312) that the ratio of queued queries compared to the concurrency threshold for the service class is greater than a threshold ratio for a queued time of greater than a defined response time, then (in step 313) method 300 evaluates a number of delta nodes for addition to the service class.

Further, in step 303, the method 300 evaluates a total number of delta nodes to be added across classes. Then, the method 300 upscales the cluster to add the delta number of worker nodes (in step 304). In step 305, the method 300 adjusts the configured service class concurrency thresholds to accommodate the new worker nodes. In addition, the method 200 can also adjust the dynamic node groups for the service classes (in step 306). The method 300 then loops to step 302, to monitor queued queries in the upscaled cluster.

Figure 4:
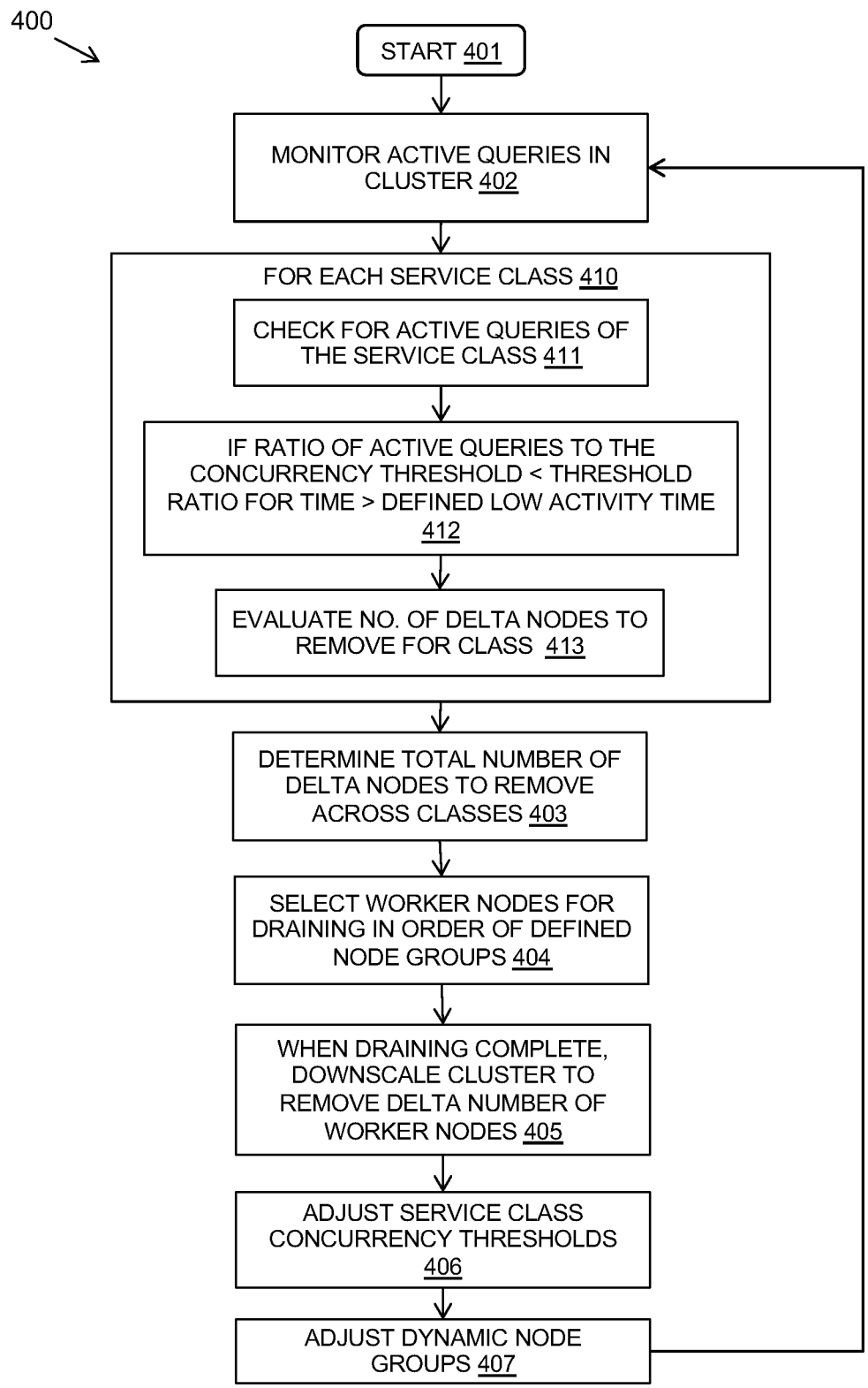
FIG. 4 is a flow diagram of an example embodiment of a downscaling method, in accordance with embodiments of the present invention.

Referring to FIG. 4, a flow diagram shows method 400, an example embodiment of a method of automatically downscaling a cluster of nodes in a query engine 100, in accordance with embodiments of the present invention. In various embodiments, query engine 100 (depicted in block diagram 101 in FIG. 1) can perform the processes of method 400.

In step 401, the method 400 initiates, then in step 402, the method 400 monitors active queries in the nodes of the cluster of the query engine 100. Then, in process 410 of method 400, for each service class, the method 400 performs steps 411-413 in an ongoing parallel manner. In step 411, the method 400 checks for active queries for the service class. In response to determining that the ratio of active queries to the concurrency threshold is less than a threshold ratio for a time greater than a defined low activity time (in step 412), then (in step 413) method 400 evaluates a number of delta nodes to remove for the service class.

Further, in step 403, the method 400 evaluates a total number of delta nodes for removal removed across classes. In various embodiments, before removal of the nodes, the nodes need to be drained. The method 400 includes selecting which worker nodes to drain in order of defined dynamic node groups affiliated to service classes (step 404). Once draining the required number of nodes is complete, then the method 400 can downscale the cluster to remove the delta number of worker nodes (step 405).

In step 406, the method 400 can adjust the configured service class active percentage thresholds to accommodate the removed worker nodes. In addition, in step 407, the method 400 can also adjust the dynamic node groups for the service classes. The method 400 then loops to step 402, to monitor queued queries in the downscaled cluster.

Figure 5A:
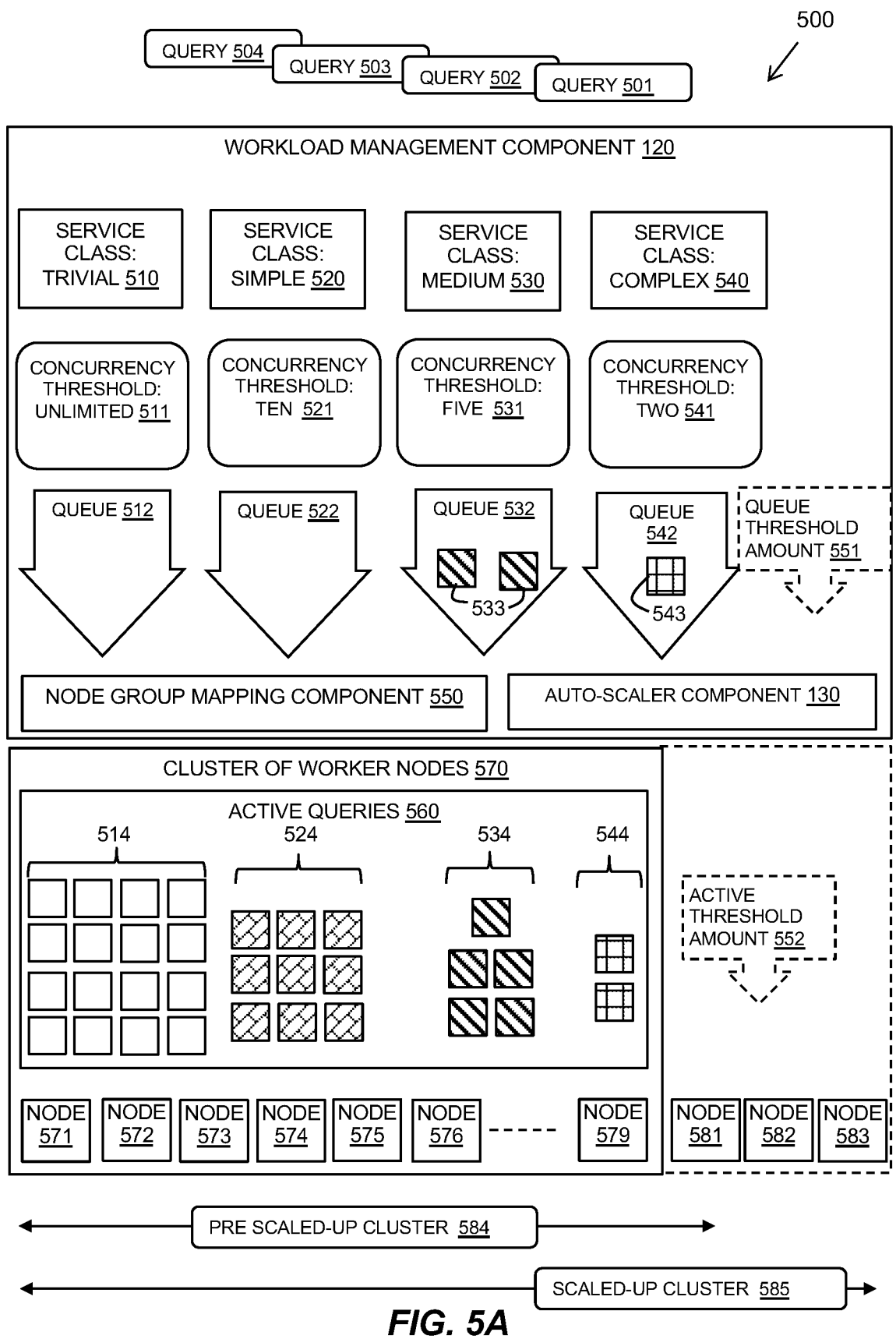
FIG. 5A is a schematic diagram of an example embodiment, in accordance with embodiments of the present invention.
Figure 5B:
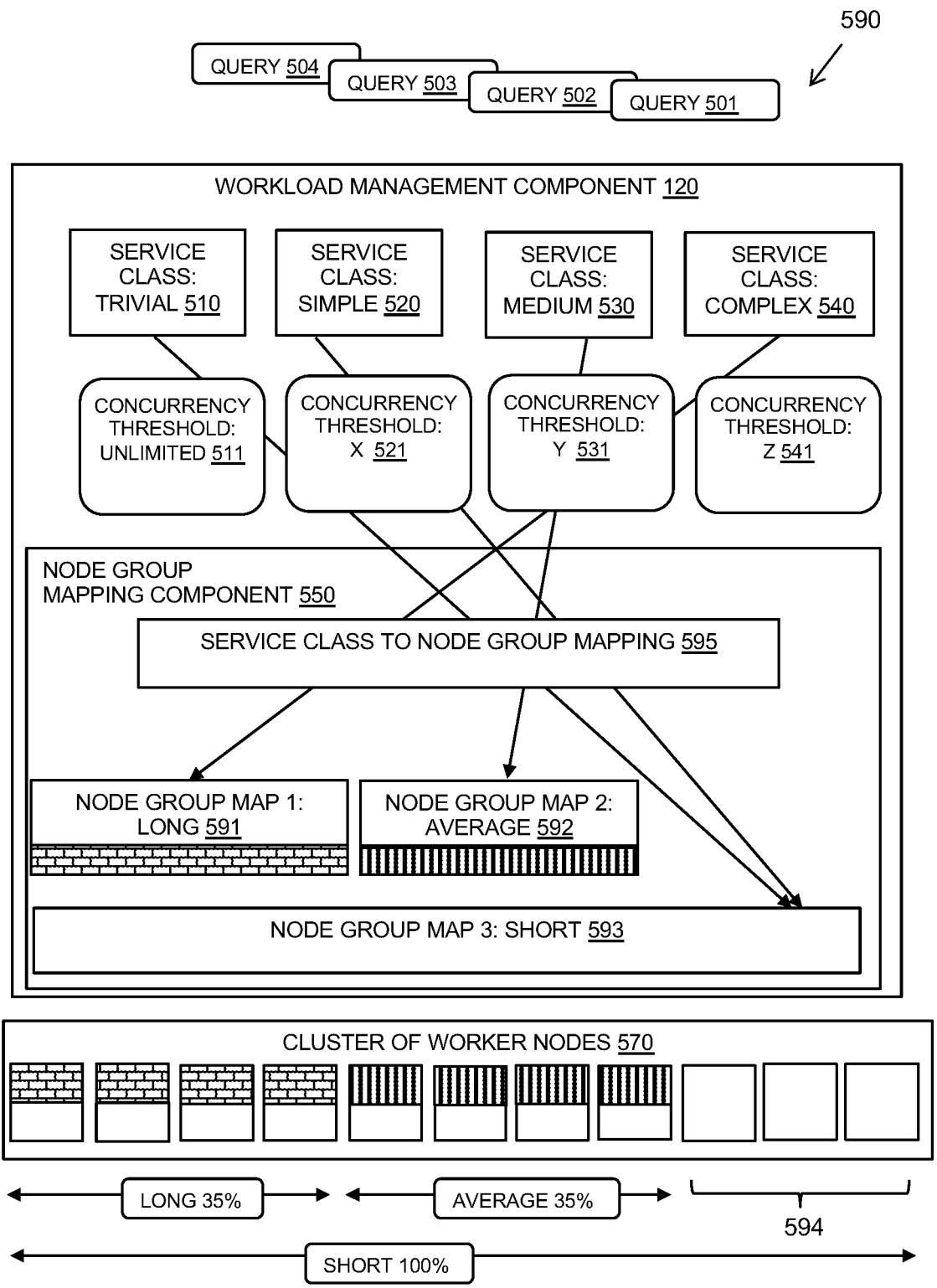
FIG. 5B is a schematic diagram of an example embodiment, in accordance with embodiments of the present invention.
Figure 5C:
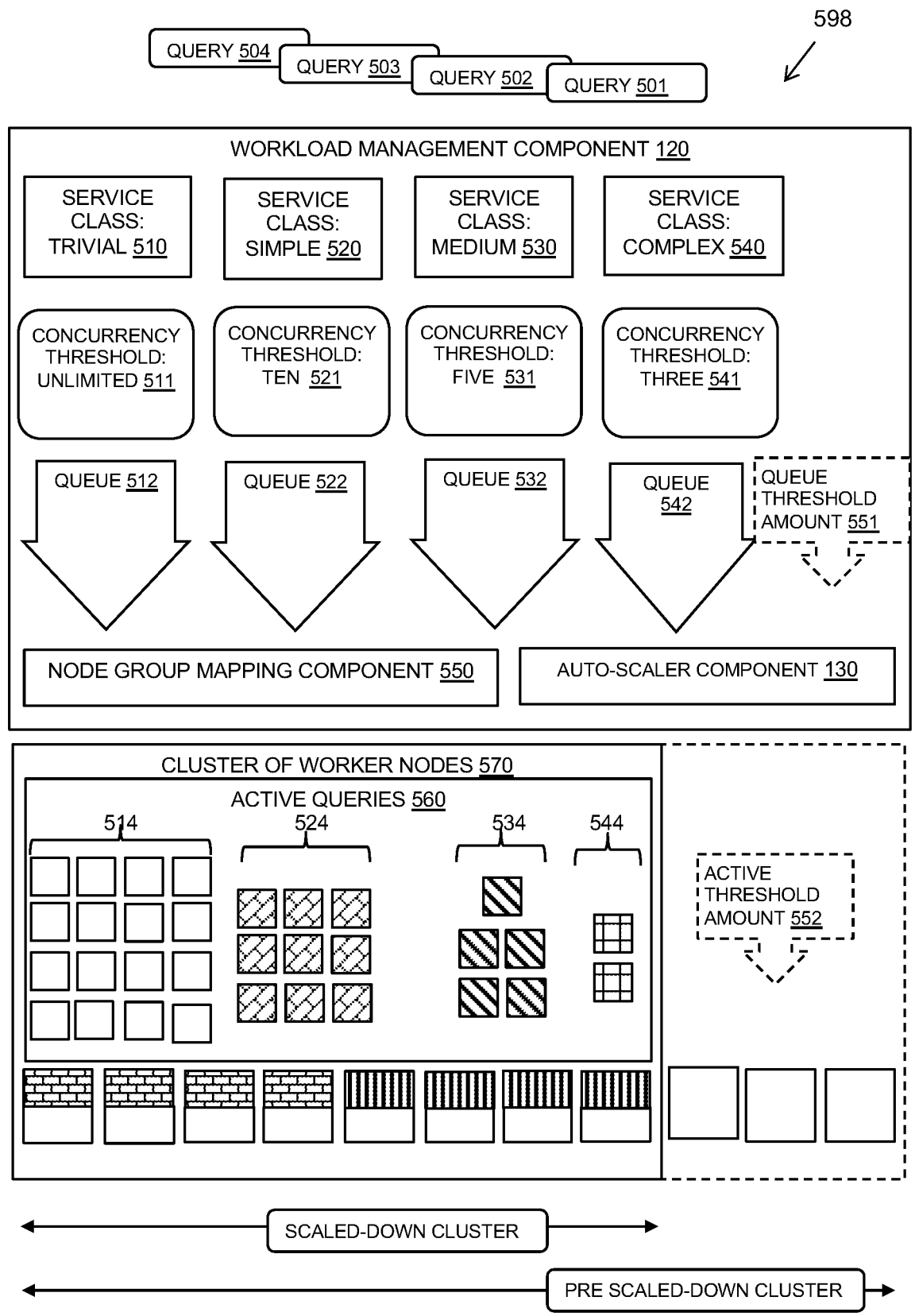
FIG. 5C is a schematic diagram of an example embodiment, in accordance with embodiments of the present invention.

FIG. 5A depicts schematic diagram 500, to illustrate an example embodiment of the described methods, in accordance with embodiments of the present invention. FIG. 5B depicts schematic diagram 590, to illustrate an example embodiment of the described methods, in accordance with embodiments of the present invention. FIG. 5C depicts schematic diagram 598, to illustrate an example embodiment of the described methods, in accordance with embodiments of the present invention. In the depicted embodiments, FIG. 5A illustrates an upscaling scenario, FIG. 5B illustrates dynamic node group affiliations to service classes, and FIG. 5C illustrates a downscaling scenario.

FIG. 5A and FIG. 5B show a workload management component 120 that receives and processes multiple queries (i.e., query 501, query 502, query 503, and query 504) for execution by a cluster of worker nodes 570, which includes node 571, node 572, node 573, node 574, node 575, node 576, node 577 node 578, and node 579 (i.e., nodes 571-579). In the depicted example, multiple service classes are configured for different cost classes of queries. In the depicted embodiment, workload management component 120 includes a Trivial service class 510, a Simple service class 520, a Medium service class 530, and a Complex service class 540. Each service class has a configured concurrency threshold as a number of concurrent queries that can be handled for each class. In the depicted embodiment, the concurrency threshold for Trivial queries is unlimited 511, for Simple queries is ten (concurrency threshold 521), for Medium queries is five (concurrency threshold 531), and for Complex queries is two (concurrency threshold 541).

The workload management component 120 includes queues 512, 522, 532, 542, for queries from each service class that are waiting for execution in the cluster of worker nodes 570. The depicted examples also include a node group mapping component 550, which is described further with regard to FIG. 5B. The cluster of worker nodes 570 may include a number of worker nodes (i.e., nodes 571-579). In addition, active queries 560 depicts numbers of active queries (i.e., Trivial active queries 514, Simple active queries 524, Medium active queries 534, and Complex active queries 544), for each service class of queries that are being executed across sub-groups of the nodes 571-579.

Referring to FIG. 5A, schematic diagram 500 illustrates auto-scaling of a number of worker nodes, in accordance with example aspects of the present invention. In an example, an administrator may configure a queue threshold amount 551, which in this example is a percentage number of queries queued in each service class compared to the concurrency threshold for each service class. In this example, the cluster administrator configures the percentage change to be a value of 50% and the response time to be five minutes. An administrator may also configure an active threshold amount 552, which in this example is a percentage number of queries active in each service class compared to the concurrency threshold for each service class.

The example shown in FIG. 5A includes sixteen Trivial active queries 514. The concurrency threshold 511 for Trivial queries is unlimited, so the concurrency threshold does not drive an upscaling of nodes. In addition, FIG. 5A depicts nine Simple active queries 524 and the concurrency threshold 521 for Simple queries is ten; therefore, the concurrency threshold does not drive an upscaling of nodes.

In a further aspect, the concurrency threshold for the Medium queries service class is five (concurrency threshold 531) and FIG. 5A depicts a full capacity of five Medium active queries 534. In addition, FIG. 5A includes two queued Medium queries 533; however, two is less than the queued threshold amount 551 of 50% and therefore this does not trigger an upscaling of nodes.

In another aspect, the concurrency threshold for a Complex queries service class 4 is set to a concurrency threshold of two (e.g., concurrency threshold 541), and two Complex active queries 544 are already running on the cluster of worker nodes 570. One new Complex query 543 is submitted to the cluster of worker nodes 570 and is queued 542 by the workload management component 120 for more than five minutes. Therefore, an auto-scaler component 130 will drive an upscale of nodes to expand the cluster of worker nodes 570.

The number of upscaled nodes may be based on a same percentage as the queue threshold amount 551; and, therefore may be calculated as 50% of the portion of nodes in the cluster that handle Complex queries. In this embodiment, the number of nodes is divided equally in three ways to handle the Simple, Medium, and Complex queries, with the Trivial queries being unrestricted across the cluster. In the example embodiment of FIG. 5A, schematic diagram 500 currently includes fifteen worker nodes (i.e., nodes 571-577), five of which handle Complex queries. An upscale is required of 50% of five nodes, which requires three extra nodes 581, 582, 583. The pre-scaled up cluster 584 is shown as nodes 571-577 and the scaled-up cluster 585 is shown as nodes 571-579 and nodes 581-583.

The auto-scaler component 130 may calculate the delta number of worker nodes required based on the following formula:

$$D = \text{ceiling}(N^*(\text{IF}(qS^*100/tS) >= p \text{ THEN } qS^*100/tS/300 \text{ ELSE } 0 \text{ ENDIF} + \text{IF}(qM^*100/tM) >= p \text{ THEN } qM^*100/tM/300 \text{ ELSE } 0 \text{ ENDIF} + \text{IF}(qC^*100/tC) >= p \text{ THEN } qC^*100/tC/300 \text{ ELSE } 0 \text{ ENDIF})$$

Where:

D is delta number of worker nodes;

tS is concurrent threshold for number of Simple queries;

tM is concurrent threshold for number of Medium queries;

tC is concurrent threshold for number of Complex queries;

qS is number of queued Simple queries;

qM is number of queued Medium queries;

qC is number of queued Complex queries;

N is number of worker nodes currently in the cluster; and p is the auto-scale percentage trigger.

It is noted that the divisor three hundred (3×100) is based on the assumption that the calibration phase resulted in equal allocation of cluster resources among the three bands of Simple, Medium, and Complex queries. This may be varied for different allocations.

Thus, in the described case, D is calculated as:

$$D = \text{ceiling}(15^*(1^*100/2/300)) = 3$$

Therefore, the cluster is expanded by three workers to increase the cluster size from fifteen to eighteen workers.

The concurrency threshold for the Medium queries service class is five (concurrency threshold 531) and if the number of Medium active queries 534 reduces to two with no queued Medium queries 533 and the condition lasts for five minutes, then the auto-scaler component 130 will drive a commensurate reduction in the cluster size (i.e., downscaling the cluster to release a calculated number of the worker nodes).

Additionally, the administrator may configure a set of dynamic nodes groups. In this embodiment, a first node group is named "long" for long running queries, which is bound to a first percentage or nodes in the cluster. A second node group is named "average" for average length running queries, which is bound to a second percentage of different nodes in the cluster. A third node group is named "short" for short length running queries, which is bound to all the nodes in the cluster. The administrator may then create a service class to node group mapping which maps the Trivial and the Simple query service classes to the "short" node group, the Medium service class to the "average" node group, and the Complex service class to the "long" node group. The mapping provides an affiliation of service classes to node groups.

Whenever the auto-scaler component initiates a scaledown operation, the candidate nodes for draining are selected from groups of nodes with the "short" node group first, then from the "average" node group, and then finally from the "long" group (e.g., only as a last resort). Accordingly, a fairly aggressive or short grace period for the drain down can be specified as any queries running in the "short" node group will be quite fleeting and will drain down quickly. As nodes are drained and released from the cluster the specified percentages for the node group allocation is maintained by dynamically adjusting the list of nodes that the query fragments are scheduled on, as new queries are submitted to the query engine.

FIG. 5B depicts the node group mapping component 550 and the service class to node group mapping 595, which provides for affinity between query complexity and certain worker nodes. In addition to assigning each query to the respective service class based on optimizer cost and applying the associated concurrency thresholds, the workload management component 120 also maps 595 queries to the appropriate node groups, which is where the query fragments for the service class queries are scheduled.

In this example, the Trivial service class 510 and Simple service class 520 queries may be mapped to a node group for "short" running queries 593 which includes all worker nodes in the cluster; the Medium service class 530 complexity queries may be mapped to the node group for "average" duration queries 592 which is bound to 35% of the worker nodes in the cluster; and the Complex service class 540 queries may be mapped to the node group for "long" running queries 591 which is bound to a different set comprising 35% of the worker nodes.

In response to initiating an operation to scale-down the cluster, the candidate worker nodes for eviction are first selected from the nodes that are exclusively bound to the short node group. In the example configuration depicted in FIG. 5B, the selection is the 30% of the worker nodes 594 in the cluster that are not also bound to the average 592 and long node groups (long running queries 591), which means the cluster can be downscaled by 30% of the original size and only short running queries (mapped based on query complexity) are required to be drained. Thus, the draindown should be fast allowing the nodes to be released quickly without any impact on running queries. If alternatively, the cluster was required to be downscaled by 50% then workers from the average node group would also need to be selected, which would incur a longer drain down duration for those nodes, perhaps requiring a grace period before taking more evasive action to complete the eviction. As the cluster is scaled, the concurrency thresholds are also proportionally adjusted to reflect the current overall compute capacity. The new concurrency thresholds are applied to any subsequently submitted query.

Putting all this together in FIG. 5C, the number of queries running the Complex service class (Complex active queries 544) is now only two, which is less than the concurrency threshold 541 of three for this service class. In a scenario where the number of queries running the Complex service class (Complex active queries 544) is two for more than five minutes, the auto-scaler component triggers a downscale operation to reduce the number of workers by a calculated delta number of three workers (i.e., in effect the reverse of scale-up that was drive in FIG. 5A). Once the scale-down operation has completed, the threshold for the Complex query service class is reverted to two (concurrency threshold 541).

Figure 6:
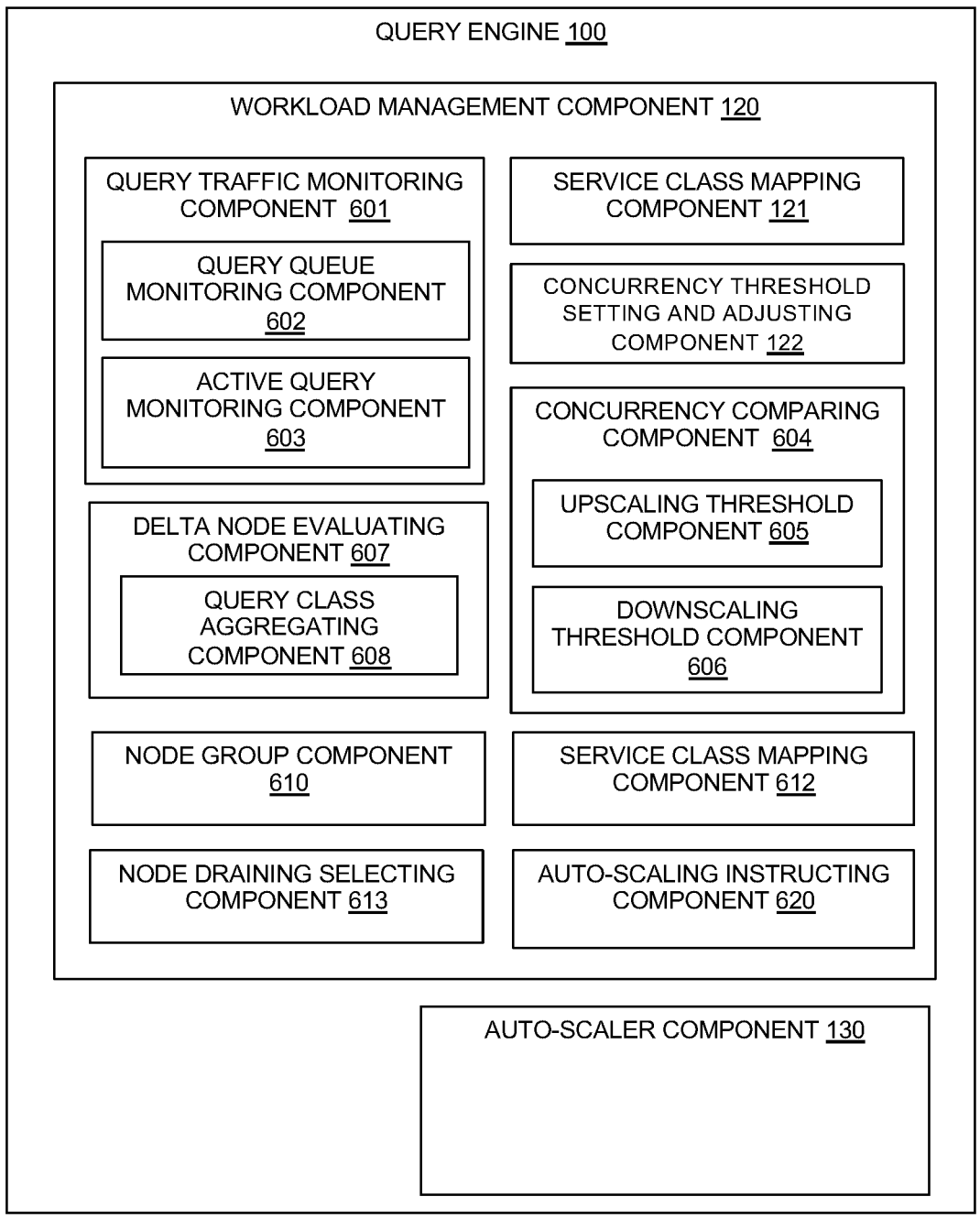
FIG. 6 is block diagram of an example embodiment of a system, in accordance with embodiments of the present invention.

Referring to FIG. 6, a block diagram shows an example embodiment of a query engine 100, with further components of a work management component 120 for instructing an auto-scaler component 130 for auto-scaling a number of worker nodes of a cluster of worker nodes that processes queries of the query engine 100, in accordance with embodiments of the present invention. The workload management component 120 may include the following components.

A query traffic monitoring component 601 monitors query traffic at the query engine with the queries classified by a service class mapping component 121 into a plurality of service classes based on a level of complexity of a query. The query traffic monitoring component 601 may include a query queue monitoring component 602 for monitoring query queues for service classes that are waiting for processing, which may be used for upscaling a number of worker nodes, and an active query monitoring component 603 for monitoring active queries being processed for service classes, which may be used for downscaling a number of worker nodes. Workload management component 120 also includes a concurrency threshold setting and adjusting component 122 for setting a maximum number of queries of a class that are allowed to be active concurrently and adjusting the maximum number based on changing numbers of worker nodes due to auto-scaling.

In addition, workload management component 120 includes a concurrency comparing component 604 for comparing query traffic for each service class with the concurrency threshold in order to determine if an upscaling threshold or a downscaling threshold is breached for a service class. The concurrency comparing component 604 may include an upscaling threshold component 605 for defining an upscaling threshold as a defined ratio of a number of queries waiting in a queue for a service class compared to the concurrency threshold for the service class for a defined period of time. The upscaling threshold is breached when the ratio is greater than the defined ratio for the defined period of time. The concurrency comparing component 604 may include a downscaling threshold component 606 for defining a downscaling threshold as a defined ratio of a number of active queries for a service class compared to the concurrency threshold for the service class for a defined period of time. The downscaling threshold is breached when the ratio is less than the defined ratio for the defined period of time.

Workload management component 120 also includes a delta node evaluating component 607 for evaluating a number of worker nodes to be added or removed based on an aggregation of the comparisons of query traffic across all service classes at a given time. Delta node evaluating component 607, for each service class for which the defined upscaling threshold or the defined downscaling threshold is breached, bases the number of worker nodes to be added or removed on a current proportion of worker nodes assigned to the service class and a required increase or decrease in capacity based on the comparison. A query class aggregating component 608 may combine the requirements of the service classes.

Further, workload management component 120 includes an auto-scaling instructing component 620 for instructing an auto-scaling of the cluster to add or remove a number of worker nodes to or from the worker nodes available in the cluster based on the comparison breaching a defined upscaling threshold or a defined downscaling threshold with the breaching maintained for a defined period of time. An auto-scaler component that is instructed may be an integrated component or may be a third-party auto-scaler component that is instructed using customized metrics. For example, the Kubernetes auto-scaler includes the ability to utilize custom metrics which may be calculated based on the instructions.

The workload management component 120 may include a node group component 610 for providing multiple node groups each comprising a subset of the available worker nodes in the cluster and where the node groups are configured for expected durations of queries. Workload management component 120 can also include a service class mapping component 612 for mapping a service class of queries to a node group in order to assign queries of a service class to worker nodes of the mapped node group. Workload management component 120 can utilize node group component 610 and a service class mapping component 612 with a node draining selecting component 613 for selecting a number of worker nodes for draining before removal when downscaling according to node groups with worker nodes being selected from a node group configured for a lowest possible expected duration of queries. The process of node draining selecting component 613 selecting a number of worker nodes for draining can include ordering the node groups with node groups for lower expected durations of queries being drained first. In example embodiments, the node group component 610 dynamically adjusts the node groups according to auto-scaling of the worker nodes.

Figure 7:
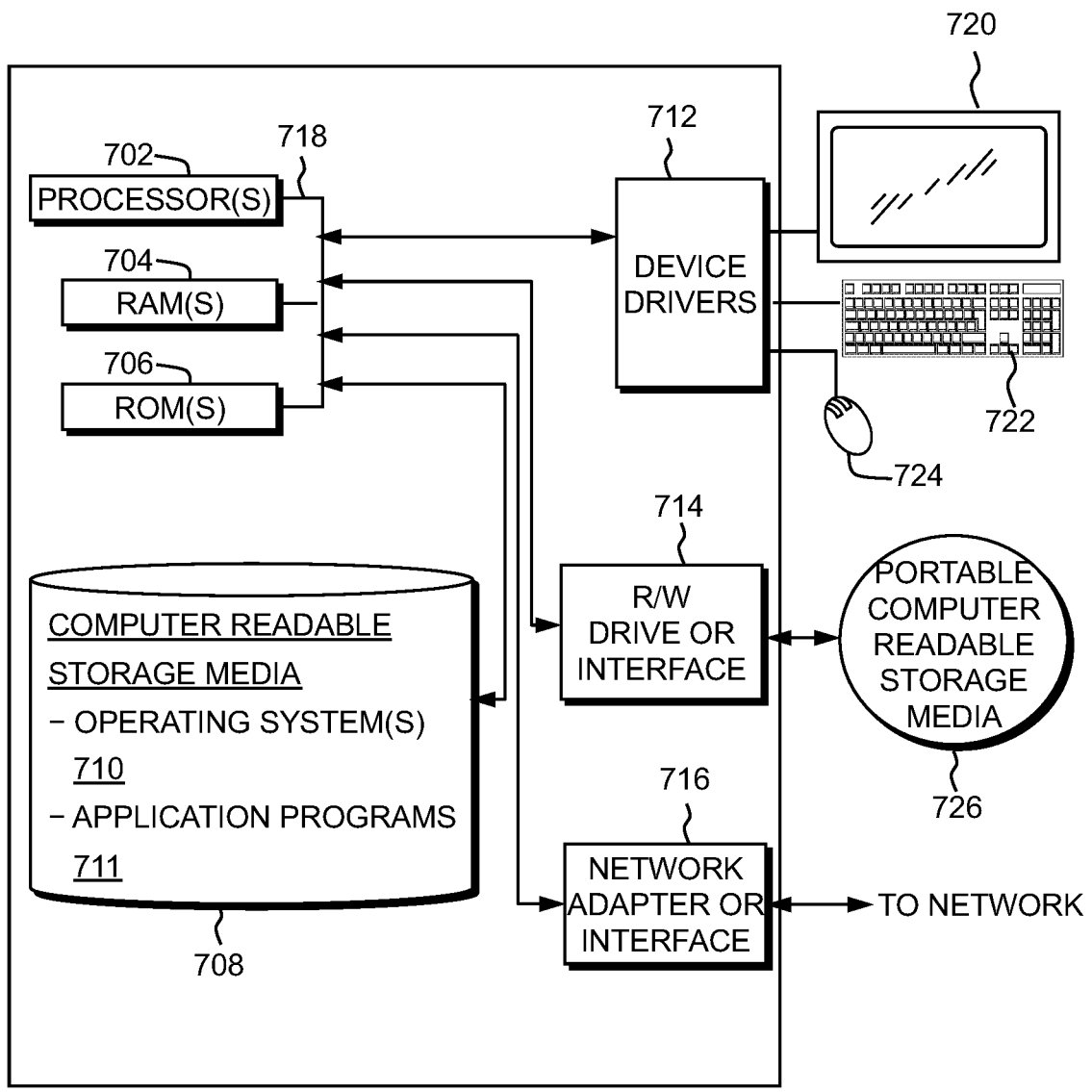
FIG. 7 is a block diagram of an embodiment of a computer system or cloud server in which the present invention may be implemented, in accordance with embodiments of the present invention.

FIG. 7 depicts a block diagram of components of the computing device of a head node of the query engine 100 of FIG. 1, in accordance with embodiments of the present invention. It should be appreciated that FIG. 7 provides only an illustration of one implementation and does not imply any limitations with regard to the environments in which different embodiments may be implemented. Many modifications to the depicted environment may be made.

Computing device can include one or more processors 702, one or more computer-readable random access memories (RAMs) 704, one or more computer-readable read-only memories (ROMs) 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as applications that corresponds to processing steps of method 200, method 300, and method 400, ] are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 714 to read from and write to one or more portable computer readable storage media 726. Application programs 711 on computing device can be stored on one or more of the portable computer readable storage media 726, read via the respective R/W drive or interface 714 and loaded into the respective computer readable storage media 708.

Computing device can also include a network adapter or interface 716, such as a TCP/IP adapter card or wireless communication adapter. Application programs 711 on computing device can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing device can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
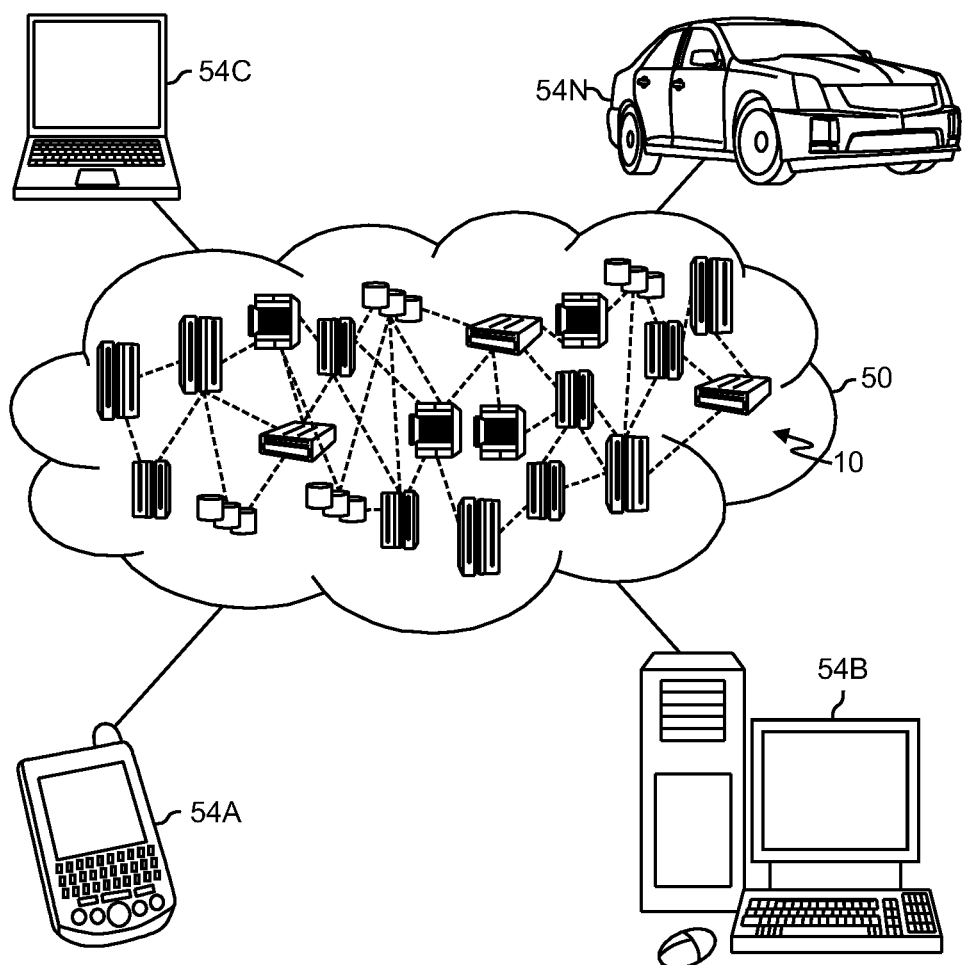
FIG. 8 is a schematic diagram of a cloud computing environment in which the present invention may be implemented, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
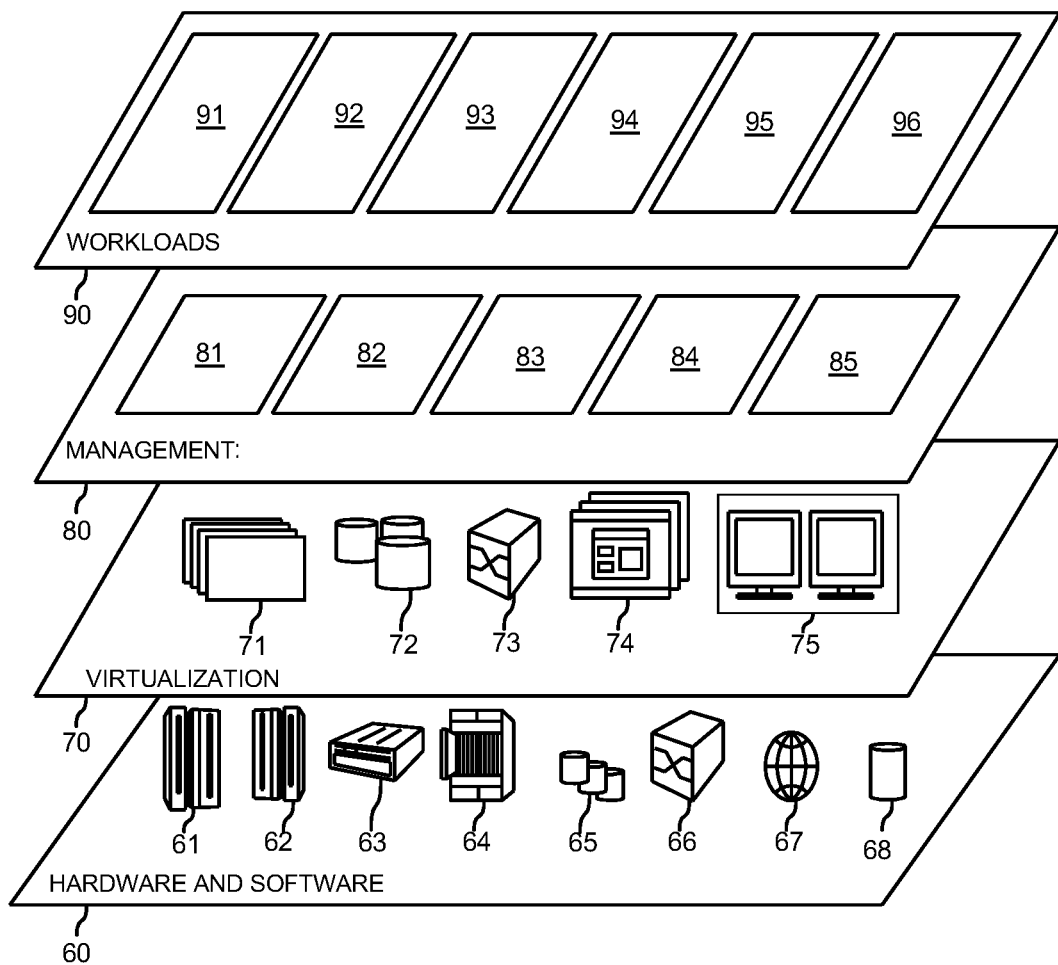
FIG. 9 is a diagram of abstraction model layers of a cloud computing environment in which the present invention may be implemented, in accordance with embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for auto-scaling a query engine, the method comprising:
monitoring, by one or more processors, query traffic at the query engine;
classifying, by one or more processors, queries of the query traffic to a service class of a plurality of service classes based on the queries in each service class having a respective level of complexity, wherein an overall resource usage for each service class of the plurality of service classes is equal, and the level of complexity is based on runtime costs for each of the queries;
comparing, by one or more processors, the query traffic, over a defined period of time, for each service class of the plurality of service classes with a concurrency threshold of a maximum number of queries of the service class allowed to be concurrently processed by each service class; and
instructing, by one or more processors, an auto-scaling of a cluster of worker nodes to change a number of worker nodes of the worker nodes available in the cluster based on the comparison, over a defined period of time, of the query traffic relative to a defined upscaling threshold and a defined downscaling threshold, wherein the auto-scaling adds or removes a number of worker nodes to a cluster of worker nodes that processes queries of the query engine.

2. The method of claim 1, wherein the defined upscaling threshold and the defined downscaling threshold are each a respective defined threshold ratio of a number of queries in the query traffic compared to the concurrency threshold of each service class.

3. The method of claim 2, further comprising:
determining, by one or more processors, the query traffic; based on queued queries waiting in queues for each service class; and
wherein the defined upscaling threshold is breached when a ratio of a number of the queued queries waiting in the queues over the defined period of time for the service class compared to the concurrency threshold for the service class is greater than a defined ratio for the defined period of time.

4. The method of claim 2, further comprising:
determining, by one or more processors, the query traffic based on active queries for each service class; and
wherein the defined downscaling threshold is breached when a ratio of a number of the active queries for a service class compared to the concurrency threshold for the service class is less than a defined ratio for the defined period of time.

5. The method of claim 1, further comprising:
evaluating, by one or more processors, the number of worker nodes to change based on an aggregation of the comparisons of query traffic across all service classes at a given time.

6. The method of claim 5, wherein evaluating the number of worker nodes to change further comprises:
for each service class for which the defined downscaling threshold is breached, determining, by one or more processors, the number of worker nodes to change based on a current proportion of worker nodes assigned to the service class and a required decrease in capacity based on the comparison.

7. The method of claim 1, further comprising:
adjusting, by one or more processors, the concurrency threshold for one or more service classes based on a new number of worker nodes in the cluster after auto-scaling.

8. The method of claim 1, further comprising:
providing, by one or more processors, multiple node groups each comprising a subset of the available worker nodes in the cluster, wherein the node groups are configured for expected durations of queries; and
mapping, by one or more processors, a service class of queries to a node group in order to assign queries of a service class to worker nodes of the mapped node group.

9. The method of claim 8, further comprising:
auto-scaling, by one or more processors, to remove a number of worker nodes by selecting a number of worker nodes for draining before removal according to node groups with worker nodes being selected from a node group configured for a lowest possible expected duration of queries.

10. The method of claim 8, wherein the node groups are dynamic and adjusted according to auto-scaling of the worker nodes.

11. The method of claim 1, wherein the concurrency threshold of the maximum number of queries allowed to be concurrently processed by each service class, further comprises:
setting, by one or more processors, for each service class, the concurrency threshold of the maximum number of queries allowed to be concurrently processed by each service class;
wherein the setting includes setting a first concurrency threshold for at least a first service class, a second concurrency threshold for a second service class, and a third concurrency threshold for a third service class, wherein the first concurrency threshold, the second concurrency threshold, and the third concurrency threshold set the maximum number of queries for each service class with the overall resource usage that is equal for the first service claims, the second service class, and the third service class.

12. A method for auto-scaling a query engine, the method comprising:
classifying, by one or more processors, queries of query traffic for a service class of a plurality of service classes based on the queries in each service class having respective levels of query complexity, wherein an overall resource usage for each service class of the plurality of service classes is equal;
auto-scaling, by one or more processors, worker nodes by adding or removing a number of worker nodes to worker nodes available in a cluster based on the query traffic at a query engine;
providing, by one or more processors, multiple node groups, each comprising a subset of the available worker nodes in the cluster, wherein the node groups are configured for an expected duration of queries; and
mapping, by one or more processors, each service class of queries to a node group according to an affinity between service classes and node groups, wherein auto-scaling by removing a number of worker nodes further comprises:
selecting, by one or more processors, a number of worker nodes for draining before removal according to node groups with worker nodes being selected from a node group configured for a lowest possible expected duration of queries.

13. The method of claim 12, wherein selecting a number of worker nodes for draining further comprises:
ordering, by one or more processors, the node groups with node groups for lower expected durations of queries being drained first.

14. The method of claim 12, wherein the node groups are dynamic and adjusted according to auto-scaling of the worker nodes.

15. The method of claim 12, further comprising:
comparing, by one or more processors, query traffic in the form of active queries for each service class with a concurrency threshold of a maximum number of queries of the service class to be concurrently processed; and
auto-scaling, by one or more processors, by removing a number of worker nodes from the worker nodes available in the cluster based on the comparison breaching a defined downscaling threshold with the breaching maintained for a defined period of time.

16. The method as claimed in claim 15, wherein the defined downscaling threshold is breached when a ratio of a number of active queries for a service class compared to the concurrency threshold for the service class is less than a defined ratio for a defined period of time.

17. A computer system for auto-scaling a query engine, the computer system comprising:
one or more computer processors;
one or more computer readable storage media; and
program instructions stored on the computer readable storage media for execution by at least one of the one or more processors, the program instructions comprising:
program instructions to monitor query traffic at the query engine;
program instructions to classify queries of the query traffic by a plurality of service classes based on the queries in each service class having a respective level of complexity of a query, wherein an overall resource usage for each service class of the plurality service classes is equal;
program instructions to compare query traffic for each service class of the plurality of service classes with a concurrency threshold of a maximum number of queries of the service class is allowed to concurrently process for each service class; and
program instructions to instruct an auto-scaling of a cluster of worker nodes to change a number of worker nodes of the worker nodes available in the cluster based on the comparison, over a defined period of time, of a number of queries in a query queue of the query traffic relative to a defined upscaling threshold for each service class and the comparison, over a defined period of time, and the comparison over the defined period of time of a number of active queries in the query traffic relative to a defined a defined downscaling threshold for each service class, wherein the auto-scaling adds or removes a number of worker nodes to a cluster of worker nodes that processes queries of the query engine.

18. The computer system of claim 17, wherein the defined upscaling threshold and the defined downscaling threshold for a service class are each one a respective defined threshold ratio of the number of queries in the query queue and the number of active queries for the service class over a defined period of time compared to the concurrency threshold for the service class.

19. The computer system of claim 17, further comprising program instructions, stored on the computer readable storage media for execution by at least one of the one or more processors, to:
evaluate a number of worker nodes to change based on an aggregation of the comparisons of the query traffic across all service classes at a given time.

20. The computer system of claim 17, further comprising program instructions, stored on the computer readable storage media for execution by at least one of the one or more processors, to:
adjust the concurrency threshold for one or more service classes based on a new number of worker nodes in the cluster after auto-scaling.

21. A computer system for auto-scaling a query engine, the computer system comprising:
one or more computer processors;
one or more computer readable storage media; and
program instructions stored on the computer readable storage media for execution by at least one of the one or more processors, the program instructions comprising:
program instructions to classify queries of query traffic to a service class of a plurality of service classes based on the queries in each service class having respective levels of query complexity, wherein each service class of the plurality service class represents a different complexity banding based on a runtime cost estimate of each query, and wherein an overall resource usage for each service class of the plurality service classes is equal;
program instructions to auto-scale worker nodes by adding or removing a number of worker nodes to worker nodes available in a cluster based on query traffic at a query engine;
program instructions to provide multiple node groups, each comprising a subset of the available worker nodes in the cluster, wherein the node groups are configured for an expected duration of queries; and
program instructions to map each service class of queries to a node group according to an affinity between service classes and node groups; and wherein auto-scaling by removing a number of worker nodes further comprise:
program instructions to select a number of worker nodes for draining before removal according to node groups with worker nodes being selected from a node group configured for a lowest possible expected duration of queries.

22. The computer system of claim 21, wherein the node groups are dynamic and adjusted according to auto-scaling of the worker nodes.

23. The computer system of claim 21 further comprising program instructions, stored on the computer readable storage media for execution by at least one of the one or more processors, to:
compare query traffic in the form of active queries for each service class with a concurrency threshold of a maximum number of queries of the service class to be concurrently processed; and
auto-scale by removing a number of worker nodes from the worker nodes available in the cluster based on the comparison breaching a defined downscaling threshold with the breaching maintained for a defined period of time.

24. A computer program product for auto-scaling a query engine, the computer program product comprising:
one or more computer readable storage media and program instructions stored on the one or more computer readable storage media, the program instructions comprising:
program instructions to monitor query traffic at the query engine;
program instructions to classify queries of the query traffic to a service class of a plurality of service classes based on the queries in each service class having a respective level of complexity of a query, wherein an overall resource usage for each service class of the plurality service classes is equal, and the level of complexity is based on runtime costs for each of the queries;
program instructions to compare query traffic for each service class of the plurality of service classes with a concurrency threshold of a maximum number of queries for each service class allowed to be concurrently processed; and
program instructions to instruct an auto-scaling of a cluster of worker nodes to change a number of worker nodes of the worker nodes available in the cluster based on the comparison, over a defined period of time, of the query traffic relative to a defined upscaling threshold and a defined downscaling threshold, wherein the autoscaling adds or removes a number of worker nodes to a cluster of worker nodes that processes queries of the query engine.

25. The computer program product of claim 24, wherein comparing query traffic for each service class with a concurrency threshold of a maximum number of queries of the service class allowed to be concurrently processed, further comprises:

program instructions to determine that a ratio of queued queries compared to the concurrency threshold for the service class is greater than a threshold ratio for a queued time greater than a defined response time; and program instructions to evaluate a number of nodes for addition to the service class.

\* \* \* \* \*